United States Patent
Eda et al.

(10) Patent No.: US 10,534,642 B2
(45) Date of Patent: Jan. 14, 2020

(54) APPLICATION RESTORE TIME FROM CLOUD GATEWAY OPTIMIZATION USING STORLETS

(71) Applicant: INTERNATIONAL BUSINESS MACHINES CORPORATION, Armonk, NY (US)

(72) Inventors: Sasikanth Eda, Vijayawada (IN); Akshat Mithal, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/713,826

(22) Filed: Sep. 25, 2017

(65) Prior Publication Data

US 2019/0095244 A1    Mar. 28, 2019

(51) Int. Cl.
| | | |
|---|---|---|
| G06F 11/14 | (2006.01) | |
| G06F 9/48 | (2006.01) | |
| H04L 29/08 | (2006.01) | |
| G06F 3/06 | (2006.01) | |
| G06F 9/46 | (2006.01) | |

(52) U.S. Cl.
CPC ............ *G06F 9/4881* (2013.01); *G06F 3/067* (2013.01); *G06F 9/462* (2013.01); *H04L 67/1097* (2013.01)

(58) Field of Classification Search
CPC .............................. G06F 9/4881; G06F 3/067
USPC ......................................................... 711/162
See application file for complete search history.

(56) References Cited

U.S. PATENT DOCUMENTS

| | | | |
|---|---|---|---|
| 8,285,681 B2 | 10/2012 | Prahlad et al. | |
| 8,601,473 B1 | 12/2013 | Aron et al. | |
| 9,021,203 B2 | 4/2015 | Hyde, II et al. | |
| 2005/0071560 A1* | 3/2005 | Bolik ................... | G06F 3/0605 711/117 |
| 2012/0316846 A1 | 12/2012 | Cohen et al. | |
| 2013/0007219 A1 | 1/2013 | Sorenson, III et al. | |

(Continued)

OTHER PUBLICATIONS

Mell et al., "The NIST Definition of Cloud Computing," National Institute of Standards and Technology, Sep. 2011, p. 1-3, Special Publication 800-145.

(Continued)

*Primary Examiner* — Jae U Yu
(74) *Attorney, Agent, or Firm* — Nicole A. Spence (57) ABSTRACT

A method, computer system, and a computer program product for designing and executing at least one storlet is provided. The present invention may include receiving a plurality of restore operations based on a plurality of data. The present invention may also include identifying a plurality of blocks corresponding to the received plurality of restore operations from the plurality of data. The present invention may then include identifying a plurality of grain packs corresponding with the identified plurality of blocks. The present invention may further include generating a plurality of grain pack index identifications corresponding with the identified plurality of grain packs. The present invention may also include generating at least one storlet based on the generated plurality of grain pack index identifications. The present invention may then include returning a plurality of consolidated objects by executing the generated storlet.

20 Claims, 7 Drawing Sheets

(56) References Cited

U.S. PATENT DOCUMENTS

2013/0212214 A1    8/2013   Lawson et al.
2016/0019214 A1    1/2016   Rand et al.

OTHER PUBLICATIONS

Rabinovici-Cohen et al., "Storlet Engine: Performing Computations in Cloud Storage," IBM Research Report, Aug. 4, 2014, p. 1-12, Report H-0320.
Pending U.S. Appl. No. 16/529,201, filed Aug. 1, 2019, entitled: "Application Restore Time From Cloud Gateway Optimization Using Storlets", 39 pages.
IBM: List of IBM Patents or Patent Applications Treated As Related (Appendix P), Aug. 21, 2019, pp. 1-2.

* cited by examiner

APPLICATION RESTORE TIME FROM CLOUD GATEWAY OPTIMIZATION USING STORLETS

BACKGROUND

The present invention relates generally to the field of computing, and more particularly to cloud computing.

As a device that connects local applications to cloud-based storage, cloud storage gateways have rapidly evolved over the years to connect a wide variety of users and applications (or operations) with a wide variety of functions to the cloud. Cloud storage gateways generally include traditional object storage architecture, where the storage nodes store an object as a full copy and replicate multiple copies of the object, or erasure coding supported object storage architecture, where the storage nodes segment the object and store the object as erasure code fragments. Optimization of the application restore time for operations from the cloud to the storage area network (SAN) environment has become as an important aspect of the cloud computing.

SUMMARY

Embodiments of the present invention disclose a method, computer system, and a computer program product for designing and executing at least one storlet. The present invention may include receiving a plurality of restore operations based on a plurality of data. The present invention may also include identifying a plurality of blocks corresponding to the received plurality of restore operations from the plurality of data. The present invention may then include identifying a plurality of grain packs corresponding with the identified plurality of blocks. The present invention may further include generating a plurality of grain pack index identifications corresponding with the identified plurality of grain packs. The present invention may also include generating at least one storlet based on the generated plurality of grain pack index identifications. The present invention may then include returning a plurality of consolidated objects by executing the generated storlet.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for designing and executing a storlet. As such, the present embodiment has the capacity to improve the technical field of cloud computing by identifying the metadata on the SAN environment, sending the metadata to a storlet generated by the storlet design and execution program, utilizing the generated storlet to determine the object, and returning the object to operate on the metadata. More specifically, the storlet design and execution program may receive the restore operation of a particular file or fragment, and then may process and prepare block addresses with a file or fragment utilizing a known filesystem. The storlet design and execution program may then identify corresponding grain packs and generate grain pack index identifications based on a metadata table. Then, the grain pack index identifications and the metadata table may be used to generate a storlet, which consolidates the grain pack index identifications into a single object, which is returned by the restore operation.

As described previously, as a device that connects local applications to cloud-based storage, cloud storage gateways have rapidly evolved over the years to connect a wide variety of users and applications (or operations) with a wide variety of functions to the cloud. Cloud storage gateways generally include traditional object storage architecture, where the storage nodes store an object as a full copy and replicate multiple copies of the object, or erasure coding supported object storage architecture, where the storage nodes segment the object and store the object as erasure code fragments. Optimization of the application restore time for operations from the cloud to the storage area network (SAN) environment has become as an important aspect of the cloud computing.

Therefore, it may be advantageous to, among other things, create a framework with an algorithm that may be integrated with traditional SAN cloud gateway to compute embedded object storage infrastructure and may offer a secure, automated way of storlet design and execution that helps in optimizing, reducing cost, response and time of restore operations from cloud to SAN environment.

According to at least one embodiment, the storlet design and execution program may provide flexibility to the traditional SAN cloud gateway and compute embedded object storage infrastructure by utilizing a transparent cloud tiering/cloud gateway, and object storage architecture.

According to at least one embodiment, the transparent cloud tiering may allow data center administrators to free up on-premises storage capacity, by moving out cooler data (i.e., less active data that is rarely used or accessed), where the cooler data can reside on SAN units or network attached storage (NAS) units, to the cloud storage, thereby reducing capital and operational expenditures.

According to at least one embodiment, the storlet design and execution program may identify the metadata (i.e., summarizes basic information about data that makes finding and working with particular instances of data easier) on the SAN environment and send the metadata to a newly created storlet that determines the object. Then, the object may operate by utilizing the metadata.

According to at least one embodiment, the storlet design and execution program may also identify the blocks corresponding to the file or fragment, which is requested for restoration, may identify the grains (i.e., multiple blocks or logical block addresses that are grouped together) or grain packs (i.e., multiple grains grouped together) under which the blocks corresponding to the object are packaged, and perform multi-byte read across different objects by a generated storlet and prepare a consolidated object or perform an offline rearrangement of blocks within the objects.

According to at least one embodiment, the storlet design and execution program may identify the blocks corresponding to a file or fragment that are requested for restoration. The storlet design and execution program, residing in the SAN storage, may prepare a block map (i.e., block map may spread across multiple disks, pools or volumes) corresponding to a single virtual machine disk (VMDK) file or erasure code (EC) fragment, which may have to be restored from the cloud. The block map may correspond to a list of logical block addresses, which may be restored from the cloud. The list of logical block addresses may be stored as grains and further stored as grain packs or objects (i.e., group of grain packs) in the cloud. Utilizing the obtained block map and the grain pack metadata, the traditional restore operation may trigger multiple object GET operations (i.e., permits the user to request a resource and obtain the content information along with the resource). In another embodiment, the traditional restore operations may trigger a single GET request in which the request may be appended with querying metadata.

According to at least one embodiment, the storlet design and execution program may identify whether the grains or grain packs associated with the blocks corresponding to the object are packaged. Upon receiving multiple parallel object GET requests or a single GET request with appended block map metadata, the storlet design and execution program residing in the object storage controller (i.e., a processor or processors embedded to perform a wide range of functions related to the storage system) as middleware may perform validation checks to understand if these requests were made by the traditional restore operation to reconstruct a VMDK file or EC fragment. If the requests are identified, then the proposed middleware (i.e., software that acts as a bridge between an operating system or database and applications, especially on a network) may start preparing the storlet with input based on the received block map and grain pack metadata.

According to at least one embodiment, the storlet design and execution program may perform multi-byte read across different objects and may prepare a consolidated object or perform an offline rearrangement of blocks within the objects. The auto-generated storlet may perform a selective multi-byte read of blocks corresponding to the block map input from each object, where the grain pack selection for read are dependent on grain pack metadata, and may consolidate the multiple blocks to a single object that may be sent in response to a GET request made by the restore operation.

Figure 1:
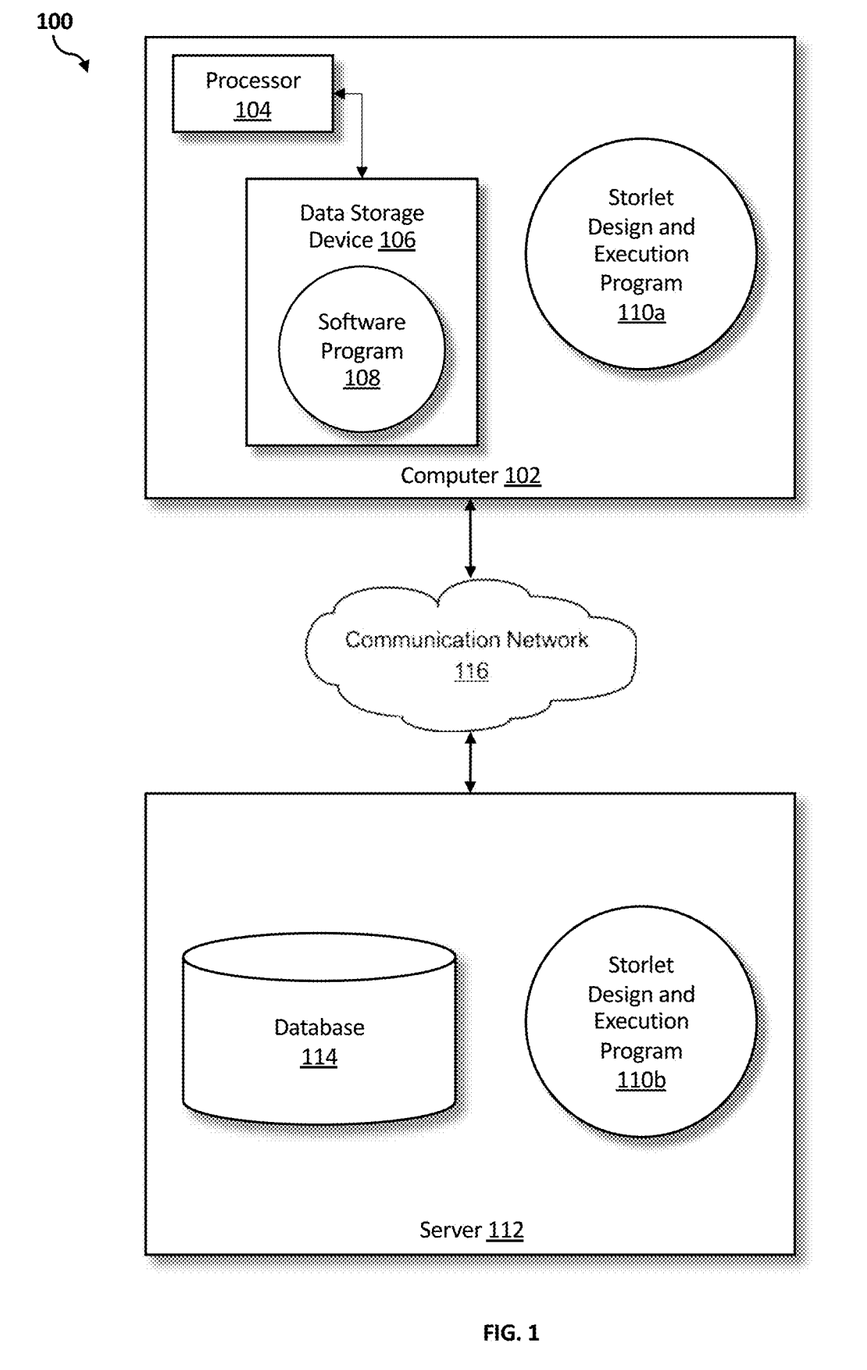
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a storlet design and execution program 110a. The networked computer environment 100 may also include a server 112 that is enabled to run a storlet design and execution program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the storlet design and execution program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the storlet design and execution program 110a, 110b (respectively) to design and execute a storlet to improve application restore time from cloud gateway optimization. The storlet design and execution method is explained in more detail below with respect to FIGS. 2 and 3.

Figure 2:
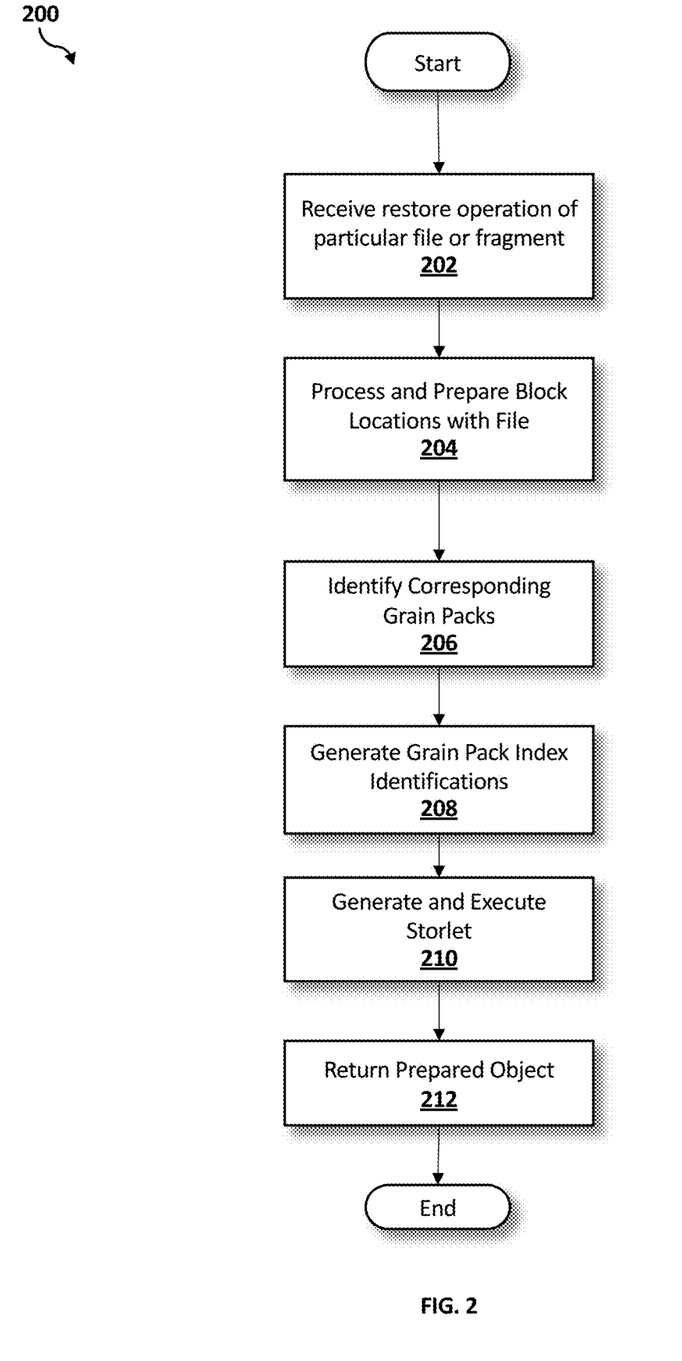
FIG. 2 is an operational flowchart illustrating a process for designing and executing a storlet according to at least one embodiment.

Referring now to FIG. 2, an operational flowchart illustrating the exemplary storlet design and execution process 200 used by the storlet design and execution program 110a and 110b according to at least one embodiment is depicted.

At 202, the restore operation of a particular file or fragment is received. A user may request a read operation of a VMDK file or EC fragment, where the file structure is maintained by a known file system using SAN volume or a storage derived from a SAN unit. Using a software program 108 on the user's device (e.g., user's computer 102), the read operation of the VMDK file or EC fragment may be transmitted as input into the storlet design and execution program 110a, 110b via a communication network 116. Alternatively, the user may manually input the read operation of the VMDK file or EC fragment into the storlet design and execution program 110a and 110b. The read operation of the VMDK file or EC fragment may then be translated to recall groups of blocks associated with a block map (i.e., grouping of block addresses).

For example, a user selects a public cloud for tiering cold data, such as snapshots and VMDK files. As such, the user manually uploads a file "Asnapshot1.vmdk" into the storlet design and execution program 110a, 110b. The VMDK file is transmitted to the storlet design and execution program 110a, 110b via a communication network 116.

A snapshot of the uploaded virtual disk 1 block layout will be described in greater detail below with respect to FIG. 4.

The following Table 1 shows another representation of the virtual disk 1, which includes the file names, size listed on the virtual machine file system (VMFS), and the block address (i.e., address location on Virtual Disk 1), and further shows the relation established between the object (stored in the cloud) with the logical block addresses (LBA):

TABLE 1

| File Name | Size listed on VMFS | Address Location on Virtual Disk1 (spread across 3 disks) |
|---|---|---|
| A vmdk | 100 GB | 0-50K |
| B snapshot 1 vmdk | 30 GB | 50K-120K |
| B vmdk | 10 GB | 120K-400K |
| A snapshot 2 vmdk | 500 GB | 400K-600K |
| B snapshot 2 vmdk | 100 GB | 600K-650K |
| A snapshot 1 vmdk | 200 GB | 650K-800K |

Additionally, the user performs a restore operation of a virtual machine "A" files, including "Asnapshot1.vmdk," due to the random nature of arranging blocks in to multiple grains and in turn into multiple grain packs, the data blocks corresponding to the "Asnapshot1.vmdk" may spread across multiple objects.

In another embodiment, the read operation of the VMDK file or EC fragment may be received as system calls by the storlet design and execution program 110a and 110b in the following format: "open ('file1', w+)."

Next, at 204, the block addresses with the file or fragment are processed and prepared. The storlet design and execution program 110a, 110b may process and prepare the block addresses that correspond to the file or fragment by utilizing a known filesystem. The storlet design and execution program 110a, 110b may initiate a read/open call to the filesystem that fetches the block addresses. The process for fetching the block addresses may be based on a dynamic algorithm that determines the block addresses from the Mode details and the super block. The filesystem may track, or maintain a known algorithm, associated with the file or fragment corresponding with block addresses. The output of the filesystem may be a description of the received data (e.g., whether the received data is a file associated with replication or fragment associated with erasure code), and an identification of the block addresses corresponding to the file or fragment.

Continuing the previous example, the storage controller is capable of performing cold data tiering to the cloud as well as virtualizing underlying storage. As such, the virtual disk created from the described storage controller is mapped to a hypervisor that created the filesystem using the virtual disk to create multiple VMDK files. Additionally, the output of the processing and preparing of the block addresses is that the storlet design and execution program 110a, 110b may determine that Asnapshot1.vmdk is a file association with replication and that 650k-800k are the block addresses associated with Asnapshot1.vmdk.

In another embodiment, if the storage controller is capable of performing cold data tiering to the cloud and acts as a storage unit for erasure code supported object storage, then multiple virtual volumes may be created from the storage controller and mapped in storage nodes of the erasure code supported object storage cluster.

Then, at 206, the corresponding grain packs are identified. Based on the block addresses, a metadata table (i.e., a data structure that the storage controller may utilize to identify which of the blocks migrated to the cloud) may be utilized to identify the corresponding grain packs with the blocks (i.e., grains). When the user requests blocks, the storage controller may check the metadata table to determine whether the blocks are residing on-premises or in the cloud. If the blocks are stored in the cloud, then the objects with the respective blocks may be recalled with the corresponding grain packs.

The metadata table may be generated by a back-up algorithm that may be triggered for one time use by utilizing a command line interface (CLI) or runs continuously as a daemon. In the initial point, the metadata table may be an empty table in the database 114 with schema initialized generated. The back-up algorithm may crawl through the blocks to populate the table (i.e., crawling is parallel and each parallel thread may select different block ranges).

The metadata table may include the object name, the grain pack index identification (i.e., grain pack ID), the grain pack index identification per grain pack (i.e., Grain IDs per Grain Pack), the logical block addresses packed per grain (i.e., LBA's packed per grain), and the grain compressed (i.e., a flag to indicate if compression may be enabled for the set of blocks). Referring to the "grain compressed" column of the metadata table, for example, if the "grain compressed" column indicates "True," then the blocks grouped under each grain may be compressed in which the space is reduced from "00000" to "5*0." If the grain compressed column indicates "False," then the blocks may be uncompressed.

Continuing the previous example, the following Table 2 is the metadata table generated by a command line interface and frequently updated:

TABLE 2

| Object Name | Grain Pack ID | Grain IDs per Grain pack | LBA's packed per grain (8 Bit) | Grain Compressed |
|---|---|---|---|---|
| 0000 | 0000 | 0, 1, 4, 6, 7, 9 | 0 (00000-00007), 1 (00008-00015), 4 (00032-00047), 6 (00056-00063), 7 (00064-00071), 9 (00088-00095) | False |
| 0001 | 0001 | 100, 200, 800, 150, 750, 900 | 100 (00800-00807), 200 (01600-01607), 800 (06400-06407), 150 (01200-01207), 750 (06000-06007), 900 (07200-07207) | True |

TABLE 2-continued

| Object Name | Grain Pack ID | Grain IDs per Grain pack | LBA's packed per grain (8 Bit) | Grain Compressed |
|---|---|---|---|---|
| 0002 | 0002 | 101, 90, 89, 56, 57, 29 | 101 (00808-00815), 90 (00720-00727), 89 (00712-00719), 56 (00448-00456), 57 (00456-00463), 29 (00232-00239) | True |
| 0003 | 0003 | 2000, 10, 2, 650, 701, 802 | 2000 (16000-160007), 10 (00000-00007), 2 (00016-00023), 650 (05200-05207), 701 (05608-05615), 802 (06416-06423) | True |
| 0004 | 0004 | 3, 95, 14, 34, 3454, 19 | 3 (00024-00031), 95 (00760-00767), 14 (00112-00119), 34 (00272-00279), 3454 (27632-27637), 19 (00152-00159) | True |
| 0005 | 0005 | 201, 208, 304, 601, 307, 309 | 201 (01608-01615), 208 (01664-01671), 304 (02432-02439), 601 (04808-04815), 307 (02456-02463), 309 (02472-02479) | False |

The metadata table is utilized to identify the corresponding grain packs with the blocks. For Asnapshot1.vmdk, the corresponding grain packs include 650, 701, 750 and 800 based on the metadata table shown in the above Table 2.

In another embodiment, the metadata table may be generated by a command line interface (e.g., admin CLI) or by a policy that may determine the criteria of migration to the cloud and update the metadata table, which may be stored in the storage controller. Additionally, a duplicate of the metadata table may be stored in the cloud as well as on-premises.

Then, at 208, the grain pack index identifications are generated. Based on the identification of the grain packs associated with the blocks, the storlet design and execution program 110a, 110b may generate the grain pack index identification. The grain pack index identification may be generated based on the administrator initial configuration. The administrator, for example, may configure the initial value as 500 and the index may be incremented accordingly. Then, the storlet design and execution program 110a, 110b may identify the object name corresponding with the grain pack index identification. Each object stored in the cloud may have metadata, where the grain pack index identification is stored. A generic database operation, for example, "select" may be utilized to search across the metadata table for corresponding grain pack index identification.

Continuing the previous example, the storlet design and execution program 110a, 110b generated 0001 and 0003 as the grain pack index identification for Asnapshot1.vmdk based on the metadata table shown above as Table 3. The grain pack index identifications are associated with the grain packs. Grain packs 750 and 800 are associated with grain pack index identification 0001, and grain packs 650 and 701 are associated with grain pack index identification 0003.

In another embodiment, the user may request blocks that spread across multiple objects. The storlet design and execution program 110a, 110b may collect the grains from each related object and prepare another final object.

Then, at 210, the storlet is generated and executed. The storlet design and execution program 110a, 110b may utilize the generated grain pack index identifications to search the metadata table to dynamically create at least one storlet (i.e., an object service extension that allows a user defined code to run inside the object store in a secure and isolated manner through the use of containers), which may perform the selective multi-byte read within the objects corresponding to requested grain pack index identifications and consolidate the requested grain pack index identifications to a single object. Once the block range is identified in the SAN environment, the grain packs may be sent to the storlet, which is located on the cloud. The storlet may read each object stored on the cloud store to determine whether the grain pack index identification matches the object checked by the user. If the grain pack index identification and the object matches, then the ranges may be read and consolidated into a corresponding object for data use.

The storlet may bring compute to storage as opposed to a traditional method of pulling data from the object storage to client nodes for computation. The storlet may be a piece of middleware, which may invoke on PUT operation. The content or metadata of object PUT may analyzed and determine whether the metadata is an algorithm or a data object.

Continuing the previous example, the storlet design and execution program 110a, 110b creates a storlet based on the grain pack index identifications of 0001 and 0003, and the supporting data for Asnapshot1.vmdk on the metadata table. The generated storlet performs a selective multi-byte read with objects 0001 and 0003, which correspond with grain pack index identifications 0001 and 0003, respectively, and consolidates the two requested grain pack index identifications (e.g., 0001 and 0003) into a single object: 00013.

In the present embodiment, the generated object may be temporary. Alternatively, if the administrator determines that the same blocks are frequently recalled by the application or the user, the administrator may change the configuration to preclude the deletion of the generated object.

In another embodiment, if the cloud user deletes the object in the cloud store, then the grain pack identification and the object may not match. The storlet may then respond to the storage controller as "NULL," which may return an error message, for example "unrecoverable or missing," to the user.

Then, at 212, the prepared object is returned. The storlet design and execution program 110a, 110b may return the corresponding objects in response to the GET request made by the restore operation. The generated storlet may be deployed into a set of proxy nodes (i.e., utilized for a distributed load handling/request handling nodes into the namespace) and storage nodes (i.e., responsible for writing in to the disks or storage subsystems to store the requests) and returns the corresponding prepared object that may be present or absent on-premises or in the cloud. The block diagram illustrating the storlet compute engine embedded object storage architecture will be described in greater detail below with respect to FIG. 3.

Additionally, the prepared object may be unpacked and the grains may be read using "load" instruction or "read" call from the unpacked prepared object, the grains may be identified from the metadata table and may be served to file a read request from the user.

Continuing the previous example, the object prepared by the storlet (e.g., 00013) is returned by the cloud and the metadata table is updated accordingly to include the new object and the corresponding grain pack index identifications and logical block addresses.

In another embodiment, if the generated storlet is deployed into a set of proxy and storage nodes and at least one corresponding object is not returned, then the storlet design and execution program 110a, 110b may present an error message and may suspend operations until resolved.

Figure 3:
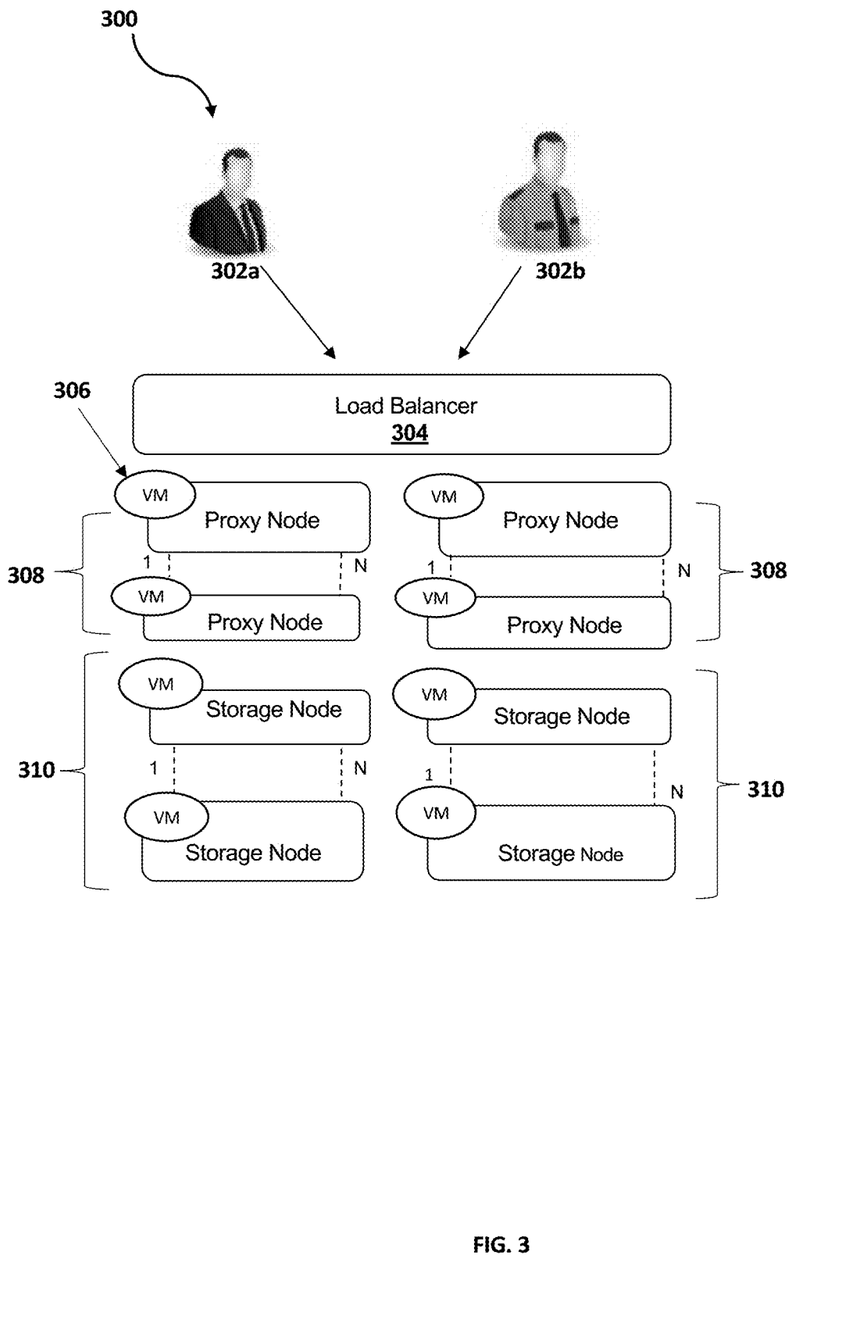
FIG. 3 is a block diagram illustrating the storlet compute engine embedded object storage architecture according to at least one embodiment.

Referring now to FIG. 3, a block diagram illustrating the exemplary storlet compute engine embedded object storage architecture 300 used by the storlet design and execution program 110a and 110b according to at least one embodiment is depicted. As shown, the storlet design and execution program 110a, 110b utilizes load balancing to distribute data across multiple computing resources (e.g., computers, computer clusters, network links, central processing units or disk drives) to optimize resource use, maximize throughput, minimize response time and avoid the overloading of a single resource.

Cloud storage gateway may provide the essential infrastructure to back-up as an object and restore as an object. The SAN back-up algorithm residing in the controller may be responsible for packing the blocks as objects and passing the blocks to the cloud gateway. Similarly, the cloud storage may be responsible to hand-over the object to restore the engine. The storlet or micro services (e.g., a container) may be located at the cloud end in which the storlet may operate on multiple objects (i.e., selecting block ranges) and may prepare the final/end object that includes the blocks for the VMDK or EC fragment file. The created end object may be passed to restore (or object PUT) request triggered by the cloud gateway.

The embedded storlet compute engine built-in object storage architecture 300 includes a load balancer 304 (i.e., receives the incoming storlet), and a software application present within the proxy nodes 308 and storage nodes 310. The users 302a and 302b may frame the storlet and may deploy or pass the storlet to the storlet design and execution program 110a, 110b as a normal object PUT operation (i.e., operation utilized to create or update). No additional client or compute node may be included for the storlet design and execution program 110a, 110b to analyze the data, since each object proxy node 308 and storage node 310 includes a VM 306 with a known computing algorithm to retrieve the object. As such, the proxy nodes 308 and storage nodes 310 may act as the compute node and return results to the users 302a and 302b.

Additionally, on each proxy node 308 and storage node 310, there are virtualization units (i.e., VM) 306 that act as the computation/processing engines for each of the nodes. The VM 306 or embedded computation engines with nodes are used for analysis and computation. As such, no external compute node for processing may be utilized with the storlet design and execution program 110a, 110b.

Additionally, the storlet compute engine embedded object storage architecture 300 may utilize virtualization technology (e.g., kernel-based virtual machine (KVM), containers, or open source light weight virtualization and sandboxing technology (ZeroVM)) deployed on the nodes to perform the computation tasks.

In another embodiment, the user may off-load the compute algorithm to storage rather than reading data from storage to a compute node for processing.

In another embodiment, the two users 302a and 302b enter input requests (in the form of algorithms) into the storlet design and execution program 110a, 110b. The received files or fragments are transmitted to a load balancer 304, which receives the incoming requests and shares the requests to proxy nodes 308 and storage nodes 310. Proxy nodes 308 are utilized for a distributed load handling/request handling nodes into the namespace and other node groups (i.e., storage nodes 310). Storage nodes 310 are responsible for writing in to the disks or storage subsystems to store the requests.

Figure 4:
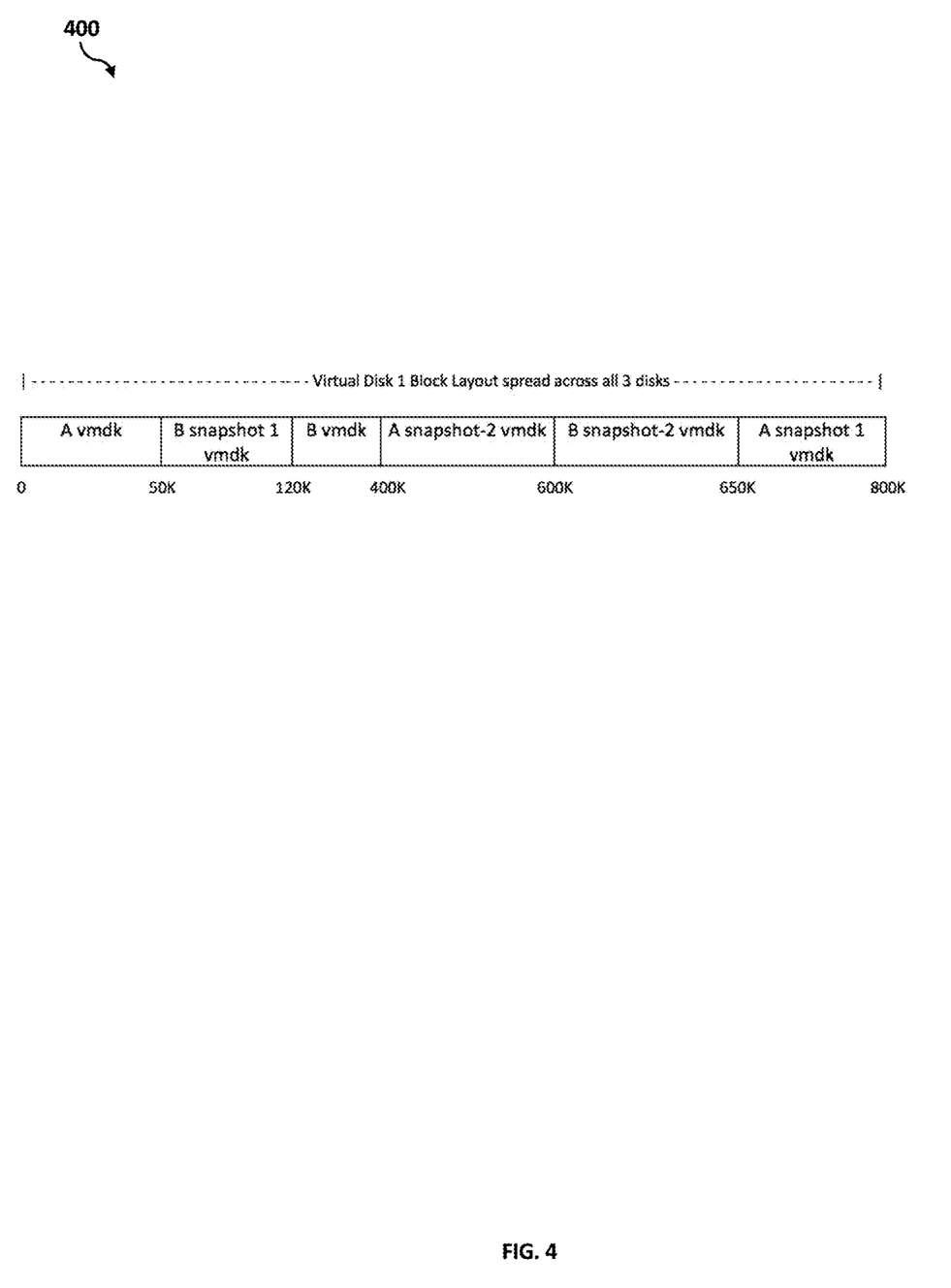
FIG. 4 is a snapshot of the uploaded virtual disk 1 block layout according to at least one embodiment.

Referring now to FIG. 4, a block diagram 400 illustrating the exemplary snapshot of the uploaded virtual disk 1 block layout, which spreads across three disks.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
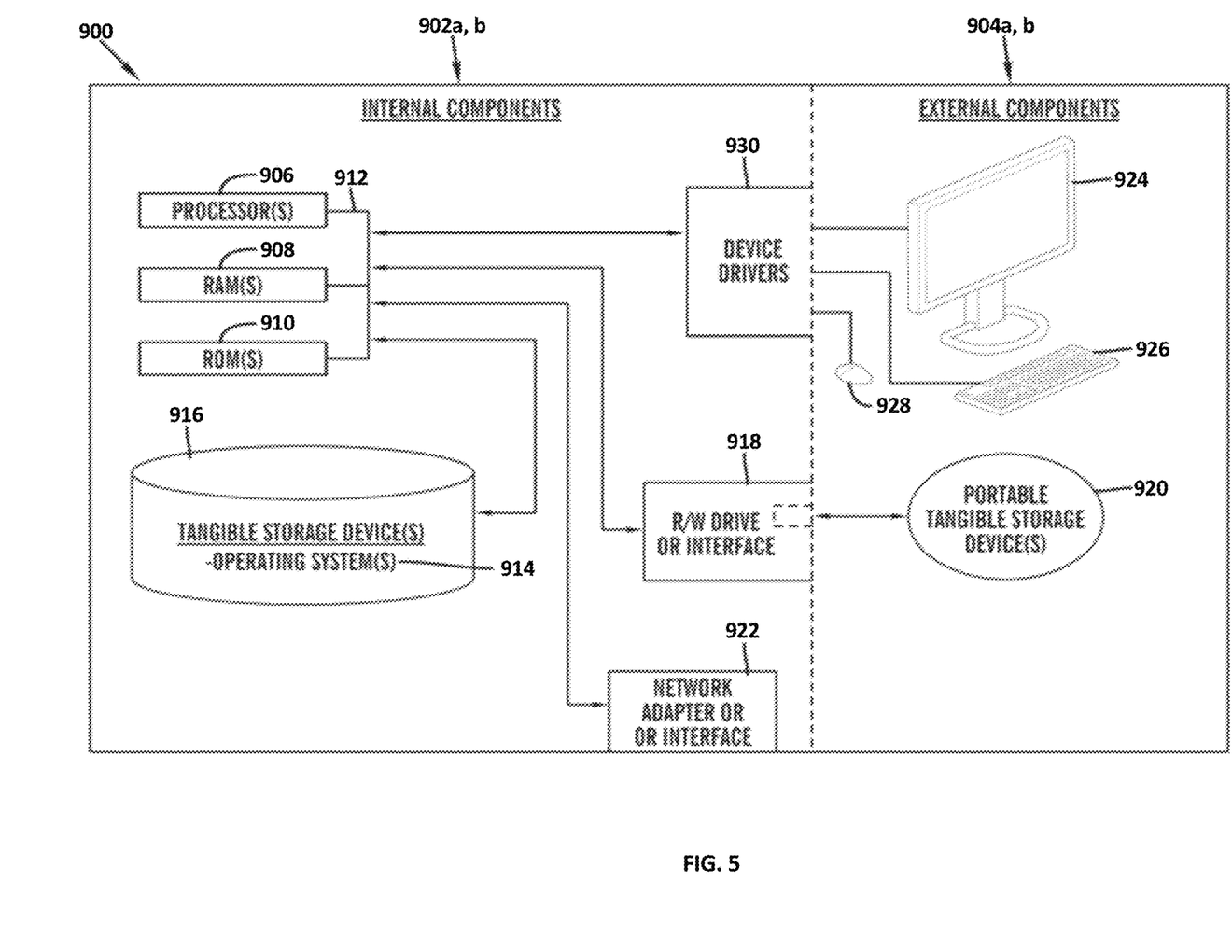
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the storlet design and execution program 110a in client computer 102, and the storlet design and execution program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the storlet design and execution program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the storlet design and execution program 110a in client computer 102 and the storlet design and execution program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the storlet design and execution program 110a in client computer 102 and the storlet design and execution program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
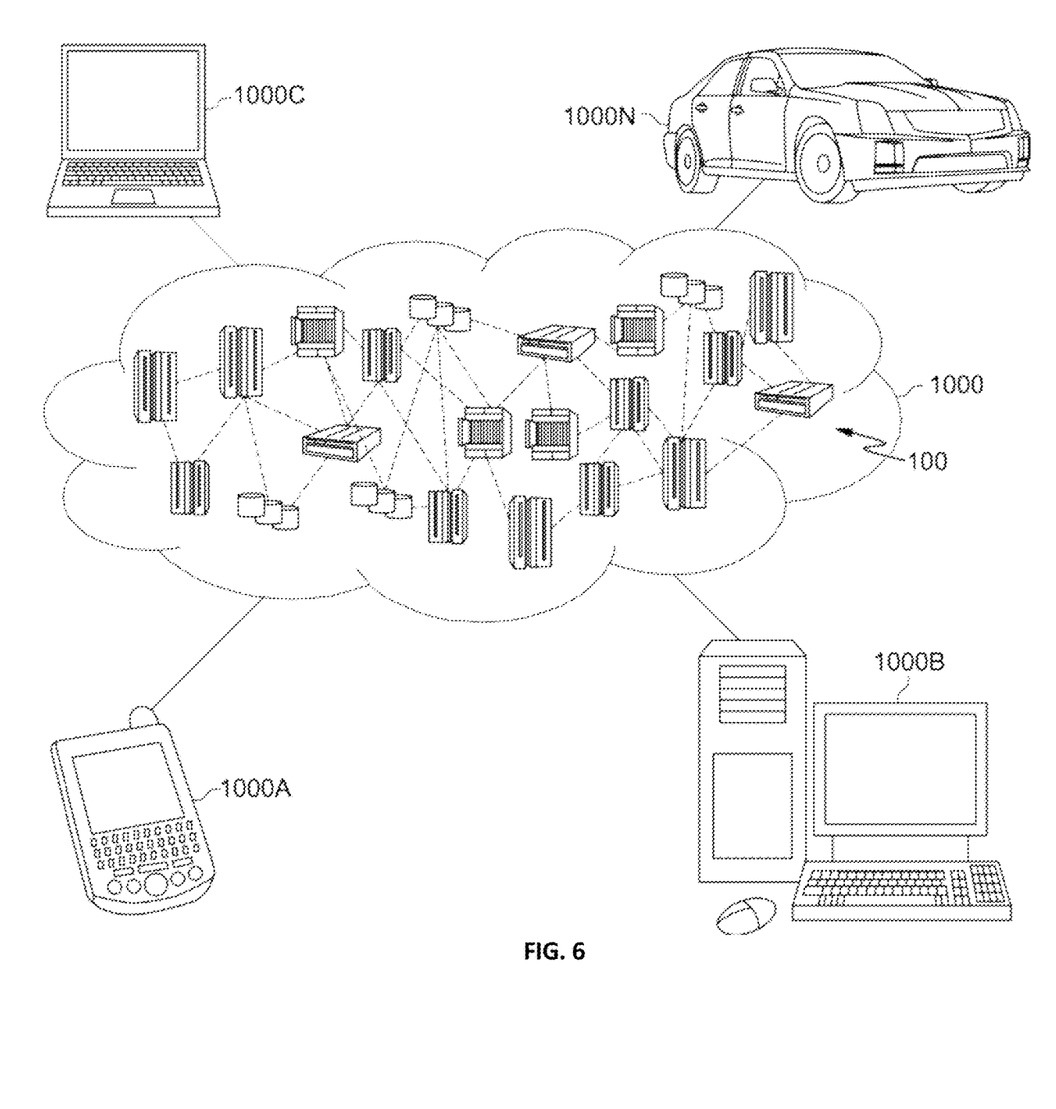
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
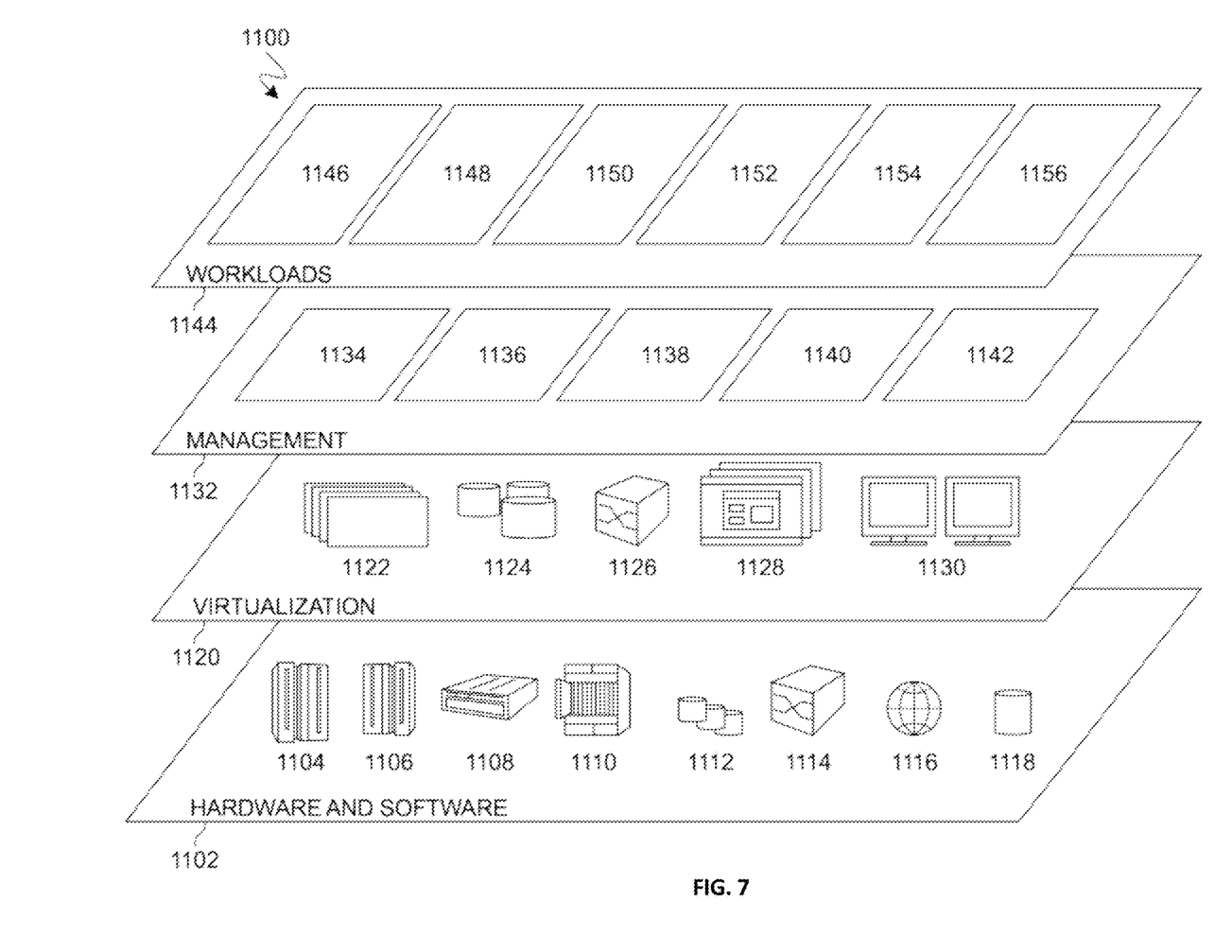
FIG. 7 is a block diagram of functional layers of the illustrative cloud computing environment of FIG. 5, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and storlet design and execution 1156. A storlet design and execution program 110a, 110b provides a way to design and execute a storlet to improve application restore time from cloud gateway optimization.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for designing and executing at least one storlet, the method comprising:
   receiving a plurality of restore operations based on a plurality of data;
   identifying a plurality of blocks corresponding to the received plurality of restore operations from the plurality of data;
   identifying a plurality of grain packs corresponding with the identified plurality of blocks;
   generating a plurality of grain pack index identifications corresponding with the identified plurality of grain packs;
   generating at least one storlet based on the generated plurality of grain pack index identifications; and
   returning a plurality of consolidated objects by executing the generated storlet,
      wherein the generated at least one storlet is deployed as a normal object PUT operation into a plurality of storage nodes and a plurality of proxy nodes.

2. The method of claim 1, wherein receiving the plurality of restore operations based on the plurality of data, further comprises:
   determining the received plurality of data is a plurality of files.

3. The method of claim 1, wherein receiving the plurality of restore operations based on the plurality of data, further comprises:
   determining the received plurality of data is a plurality of erasure code fragments.

4. The method of claim 1, wherein identifying the plurality of grain packs corresponding with the identified plurality of blocks, further comprises:
   utilizing a metadata table to determine the identified plurality of grain packs associated with the identified plurality of blocks.

5. The method of claim 1, further comprising:
   performing a selective multi-byte read operation with a plurality of objects associated with the generated plurality of grain pack index identifications by the generated storlet; and
   consolidating the generated plurality of grain pack index identifications to a single object.

6. The method of claim 1, wherein returning the plurality of consolidated objects by executing the generated storlet, further comprises:

analyzing the deployed storlet by a plurality of virtualization units associated with the plurality of storage nodes and the plurality of proxy nodes.

7. The method of claim 6, further comprising:
determining that the returned plurality of consolidated objects is absent; and
returning an error message to the user.

8. The method of claim 6, further comprising:
determining that the returned plurality of consolidated objects is present; and
returning the plurality of consolidated objects by executing the generated storlet.

9. A computer system for designing and executing at least one storlet, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a plurality of restore operations based on a plurality of data;
identifying a plurality of blocks corresponding to the received plurality of restore operations from the plurality of data;
identifying a plurality of grain packs corresponding with the identified plurality of blocks;
generating a plurality of grain pack index identifications corresponding with the identified plurality of grain packs;
generating at least one storlet based on the generated plurality of grain pack index identifications; and
returning a plurality of consolidated objects by executing the generated storlet,
wherein the generated at least one storlet is deployed as a normal object PUT operation into a plurality of storage nodes and a plurality of proxy nodes.

10. The computer system of claim 9, wherein receiving the plurality of restore operations based on the plurality of data, further comprises:
determining the received plurality of data is a plurality of files.

11. The computer system of claim 9, wherein receiving the plurality of restore operations based on the plurality of data, further comprises:
determining the received plurality of data is a plurality of erasure code fragments.

12. The computer system of claim 9, wherein identifying the plurality of grain packs corresponding with the identified plurality of blocks, further comprises:
utilizing a metadata table to determine the identified plurality of grain packs associated with the identified plurality of blocks.

13. The computer system of claim 9, further comprising:
performing a selective multi-byte read operation with a plurality of objects associated with the generated plurality of grain pack index identifications by the generated storlet; and
consolidating the generated plurality of grain pack index identifications to a single object.

14. The computer system of claim 9, wherein returning the plurality of consolidated objects by executing the generated storlet, further comprises:
analyzing the deployed storlet by a plurality of virtualization units associated with the plurality of storage nodes and the plurality of proxy nodes.

15. The computer system of claim 14, further comprising:
determining that the returned plurality of consolidated objects is absent; and
returning an error message to the user.

16. The computer system of claim 14, further comprising:
determining that the returned plurality of consolidated objects is present; and
returning the plurality of consolidated objects by executing the generated storlet.

17. A computer program product for designing and executing at least one storlet, comprising:
one or more computer-readable storage tangible media and program instructions stored on at least one of the one or more non-transitory computer readable medium, the program instructions executable by a processor to cause the processor to perform a method comprising:
receiving a plurality of restore operations based on a plurality of data;
identifying a plurality of blocks corresponding to the received plurality of restore operations from the plurality of data;
identifying a plurality of grain packs corresponding with the identified plurality of blocks;
generating a plurality of grain pack index identifications corresponding with the identified plurality of grain packs;
generating at least one storlet based on the generated plurality of grain pack index identifications; and
returning a plurality of consolidated objects by executing the generated storlet,
wherein the generated at least one storlet is deployed as a normal object PUT operation into a plurality of storage nodes and a plurality of proxy nodes.

18. The computer program product of claim 17, wherein receiving the plurality of restore operations based on the plurality of data, further comprises:
determining the received plurality of data is a plurality of files.

19. The computer program product of claim 17, wherein receiving the plurality of restore operations based on the plurality of data, further comprises:
determining the received plurality of data is a plurality of erasure code fragments.

20. The computer program product of claim 17, wherein identifying the plurality of grain packs corresponding with the identified plurality of blocks, further comprises:
utilizing a metadata table to determine the identified plurality of grain packs associated with the identified plurality of blocks.

* * * * *